C. E. McCORMICK.
RAKE CLEANER.
APPLICATION FILED MAR. 12, 1914.
1,112,308.
Patented Sept. 29, 1914.
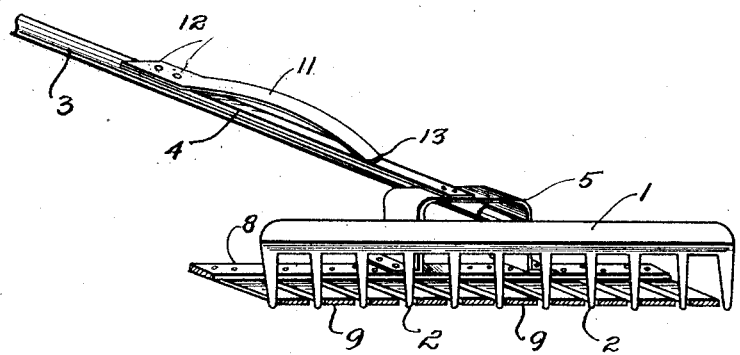
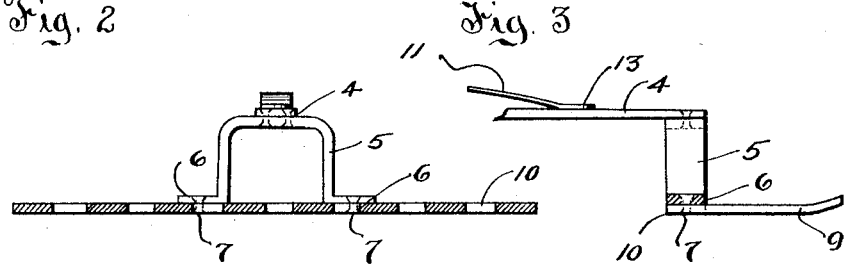

UNITED STATES PATENT OFFICE.

CHARLES E. McCORMICK, OF INDEPENDENCE, MISSOURI, ASSIGNOR OF ONE-HALF TO B. W. McCORMICK, OF INDEPENDENCE, MISSOURI.

RAKE-CLEANER.

1,112,308.  Specification of Letters Patent.  Patented Sept. 29, 1914.

Application filed March 12, 1914. Serial No. 824,220.

*To all whom it may concern:*

Be it known that I, CHARLES E. McCORMICK, a citizen of the United States, residing at Independence, in the county of Jackson and State of Missouri, have invented certain new and useful Improvements in Rake-Cleaners; and I do hereby declare the following to be a full, clear, and exact description of the invention, such as will enable others skilled in the art to which it appertains to make and use the same.

This invention relates to rake cleaners, and one of the principal objects of the same is to provide a rake cleaner which will operate automatically to clean the teeth of the rake at each reciprocation thereof.

Another object of the invention is to provide a spring actuated rake cleaner which will discharge the rakings at the end of each backward stroke of the rake automatically.

Still another object of the invention is to provide a rake cleaner which will serve as a protection for the teeth of the rake when the latter has been thrown on the ground with the teeth side up.

These and other objects may be attained by means of the construction illustrated in the accompanying drawing, in which, Figure 1 is a perspective view of a rake having a cleaner connected thereto made in accordance with this invention, Fig. 2 is a transverse sectional view taken through the teeth of the cleaner removed from the rake, Fig. 3 is a detail longitudinal sectional view taken through the rake cleaner.

Referring to the drawing, the numeral 1 designates a rake head provided with teeth 2 of the usual or any suitable construction. A handle 3 is connected to the rake head in the usual manner.

The cleaner comprises a spring metal shank 4 connected to the handle 3 and at its front end provided with an inverted U-shaped bracket 5. The ends of the U-shaped bracket 5 are turned outwardly as at 6 and the outwardly turned ends are connected by rivets 7 to the cleaner. The cleaner comprises a transverse bar 8 having connected thereto a number of cleaning members 9 which project forwardly between the teeth 2 of the rake, as shown in Fig. 1 of the drawing. It will be understood however, that the cleaning device may be made entirely of a single piece of metal with the plates 9 projecting from the integral cross bar 10, as shown in Figs. 2 and 3. A leaf spring 11 is secured to the handle 3, as at 12, and the front end of the spring is slightly curved and has its free end bearing as at 13 against the bar or shank 4 of the cleaner.

In operation as the rake is drawn toward the operator, the rakings are discharged at the end of the stroke by the action of the spring 11 forcing downward upon the shank 4 of the cleaner and carrying the cleaning elements 9 to the ends of the teeth. During the backward movement of the rake toward the operator, the cleaning plates 9 do not interfere with the action of the rake, but just as soon as the rake is lifted the teeth are automatically cleaned and the rakings discharged ready for the next stroke of the rake. Should the rake be thrown on the ground with its teeth ends up, any person stepping upon the rake would not be injured and would not break the rake teeth for the reason that the bracket 5 would lie in contact with the ground and prevent the cleaner plates 9 from moving relatively to the teeth.

From the foregoing it will be obvious that a rake cleaner made in accordance with this invention can be connected to any rake head, can be manufactured at low cost, and is strong, durable and efficient for its purpose.

Various changes may be made in the details of construction without departing from the spirit and scope of the invention as defined in the claims.

What is claimed is:—

1. The combination with a rake consisting of a handle, a head on said handle and teeth carried by the head of a shank connected to the handle of the rake, a U-shaped bracket connected to said shank, a raker cleaner connected to said bracket and having plates extending between the teeth of the rake, and a spring bearing upon the shank of the cleaner to cause same to automatically discharge the rakings at the end of each backward stroke of the rake.

2. The combination with a rake consisting of a handle, a head on one end of said handle and teeth carried by said head of a shank, a U-shaped bracket connected to the shank, a bar having outwardly extending cleaner plates connected thereto, said bar being attached to said bracket and a leaf spring connected to the handle of the rake and having its free end bearing upon the shank of the cleaner to move the cleaner plates toward the ends of the teeth when the rake is lifted from the ground.

In testimony whereof I affix my signature in presence of two witnesses.

CHARLES E. McCORMICK.

Witnesses:
 GEORGE W. LEACH,
 BENJAMINE W. McCORMICK.

Copies of this patent may be obtained for five cents each, by addressing the "Commissioner of Patents, Washington, D. C."